Figure 1:
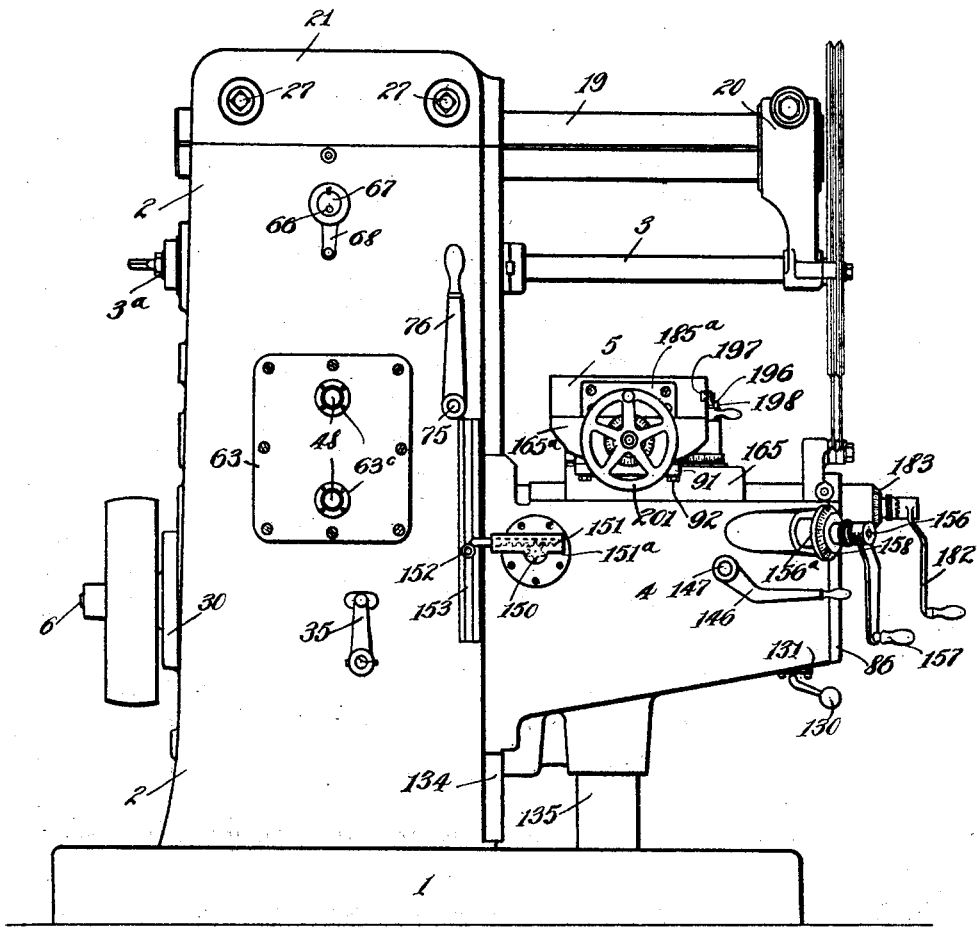

F. S. SHIELDS AND J. A. CAMM.
MACHINE TOOL.
APPLICATION FILED MAY 14, 1917.

1,387,517.

Patented Aug. 16, 1921.
13 SHEETS—SHEET 1.

Inventors
Frank S. Shields
John A. Camm,
By Hull, Smith, Brock & West,
Attys

F. S. SHIELDS AND J. A. CAMM.
MACHINE TOOL.
APPLICATION FILED MAY 14, 1917.

1,387,517.

Patented Aug. 16, 1921.
13 SHEETS—SHEET 2.

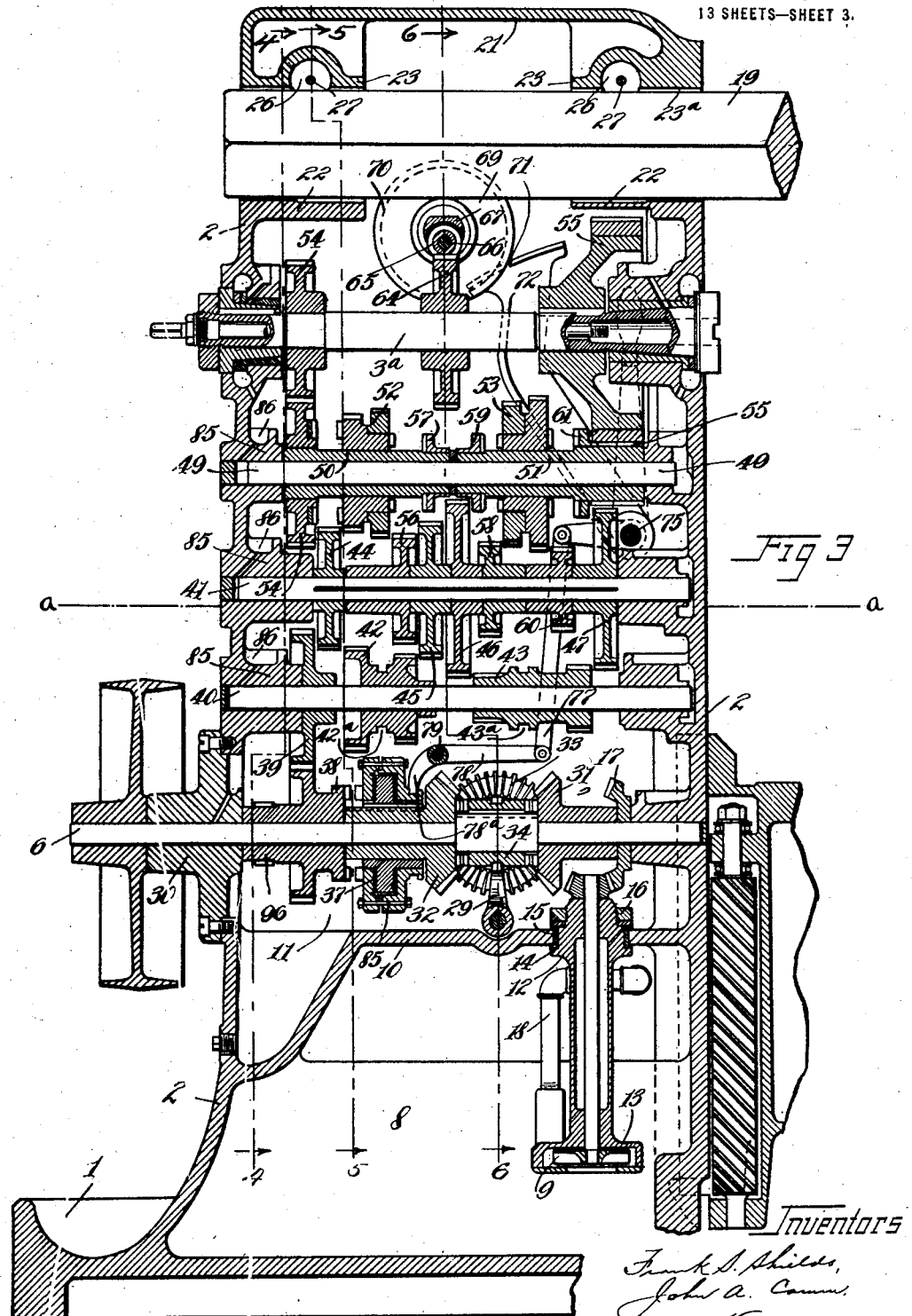

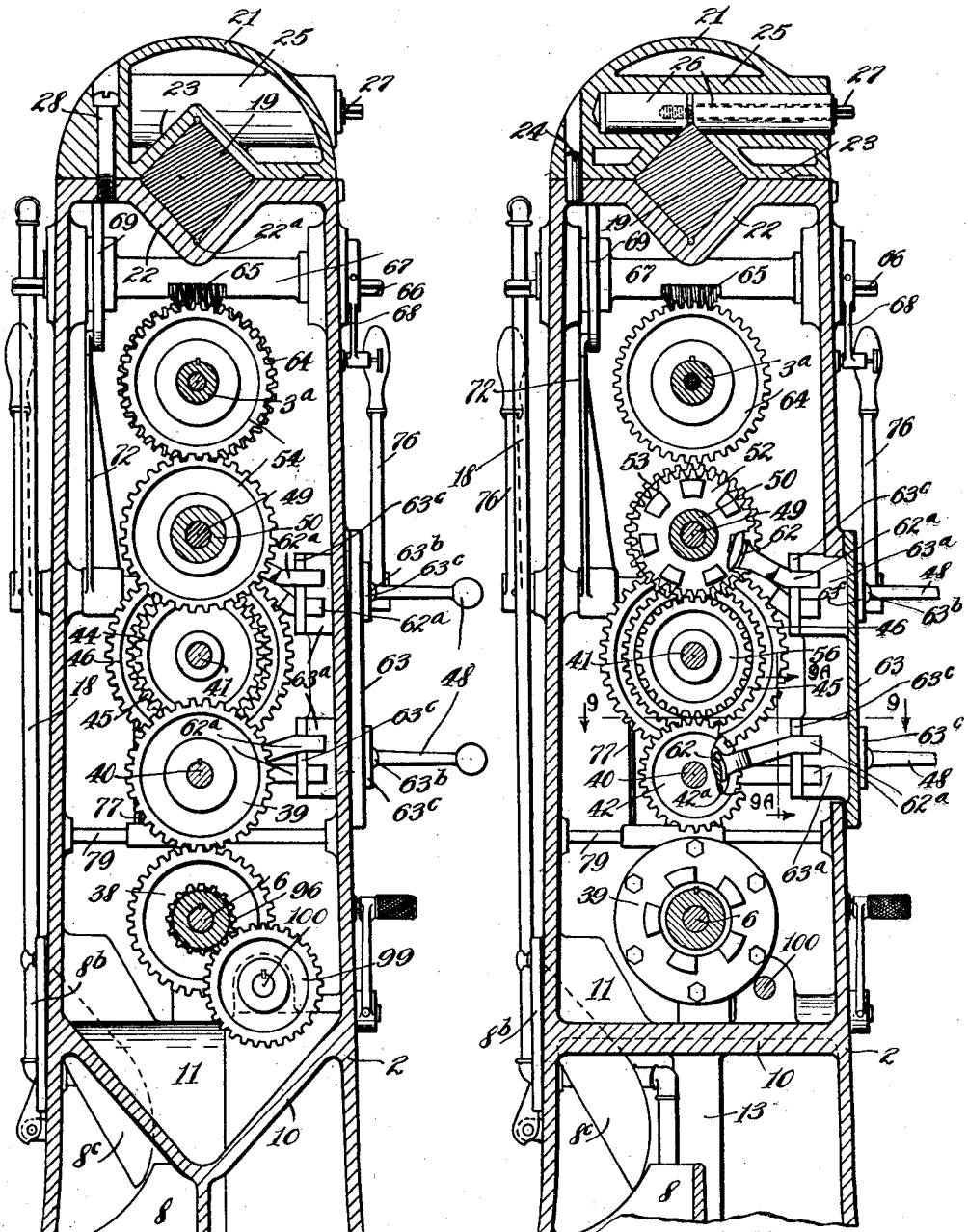

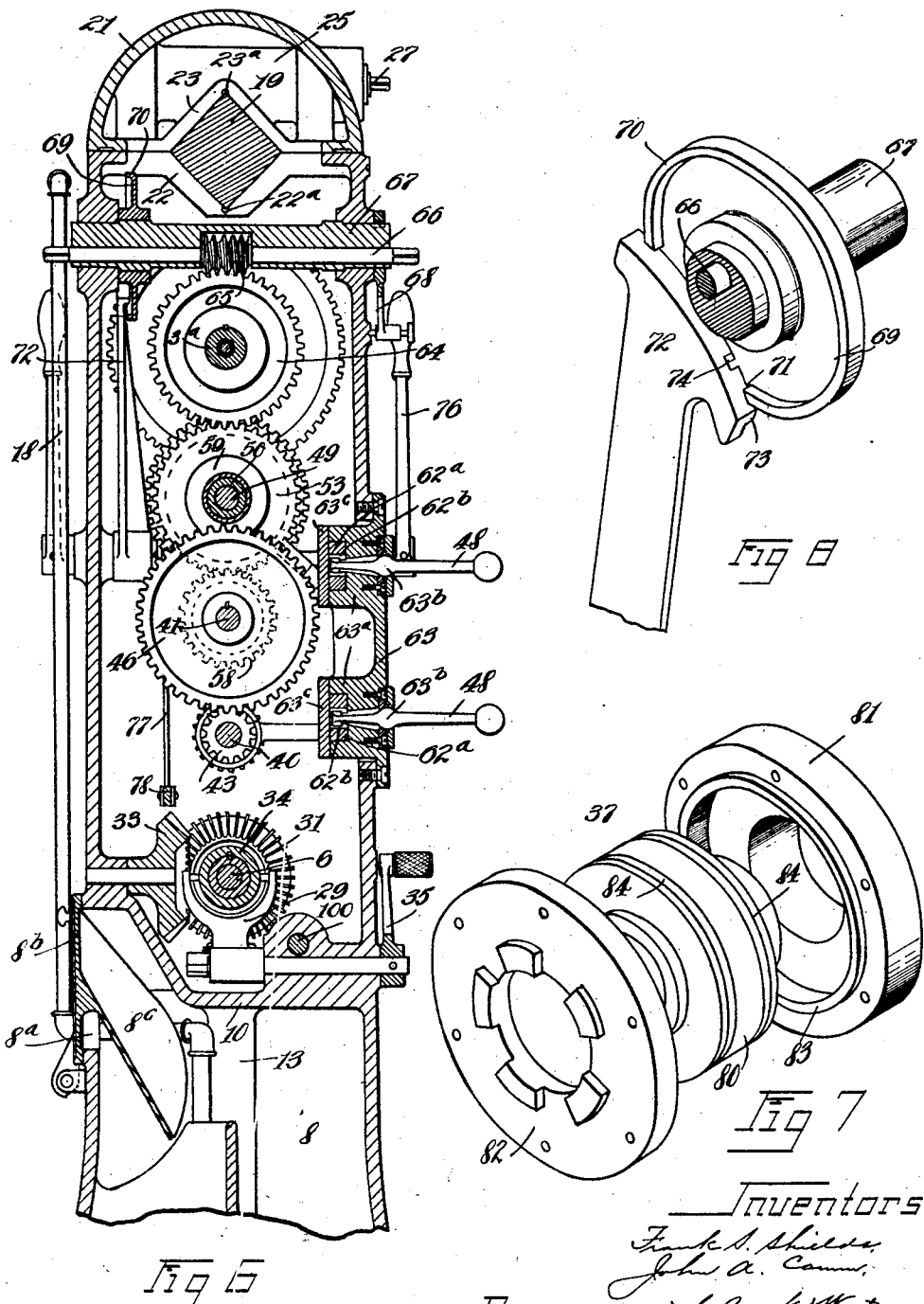

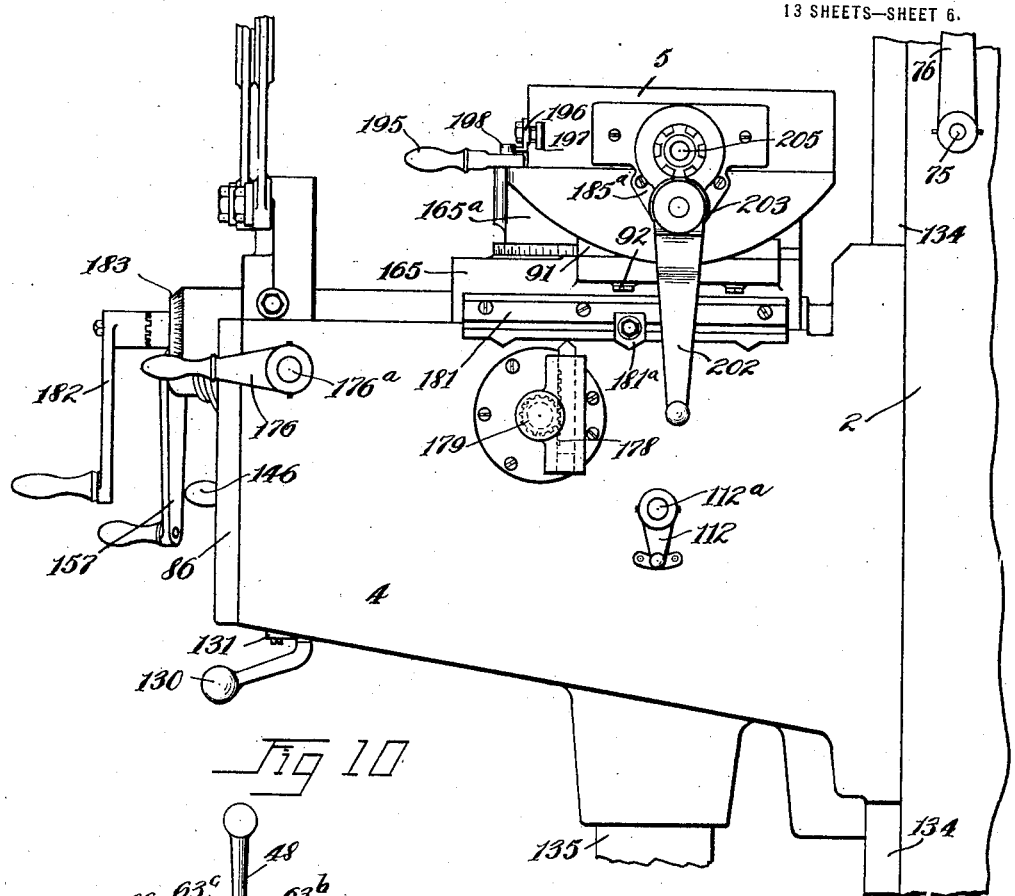
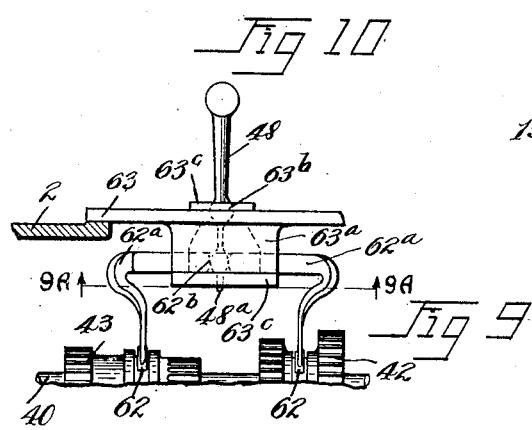
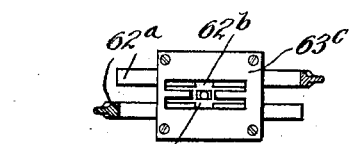

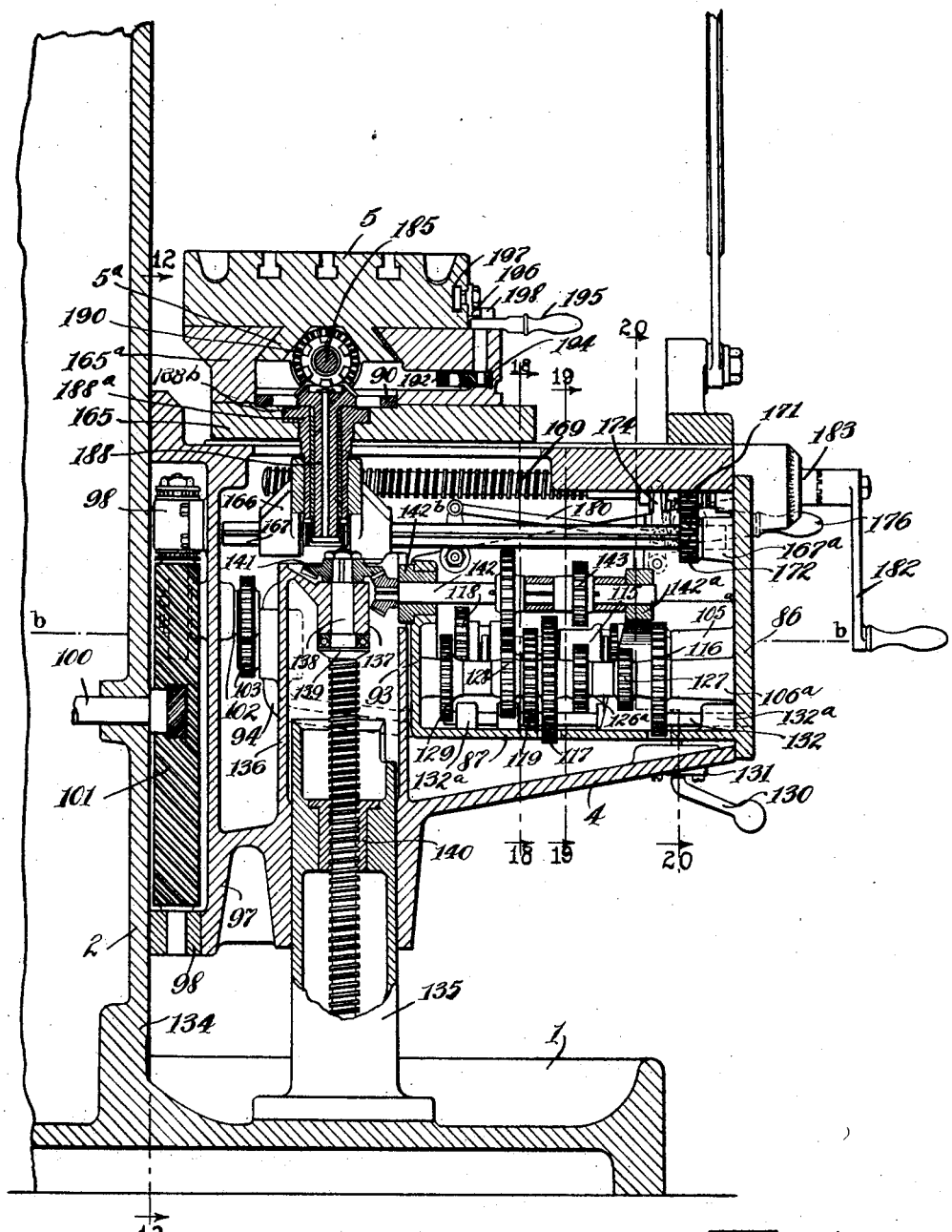

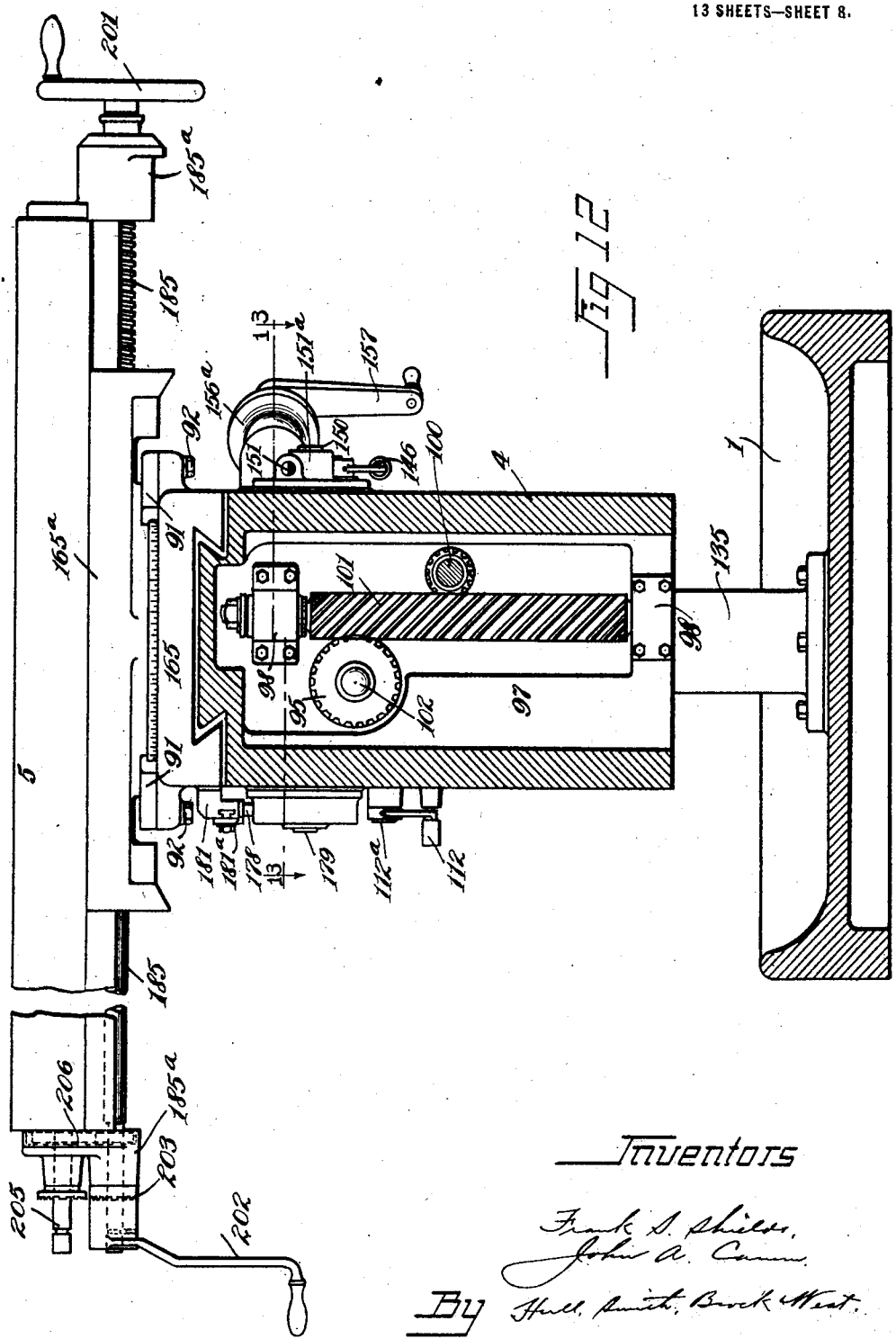

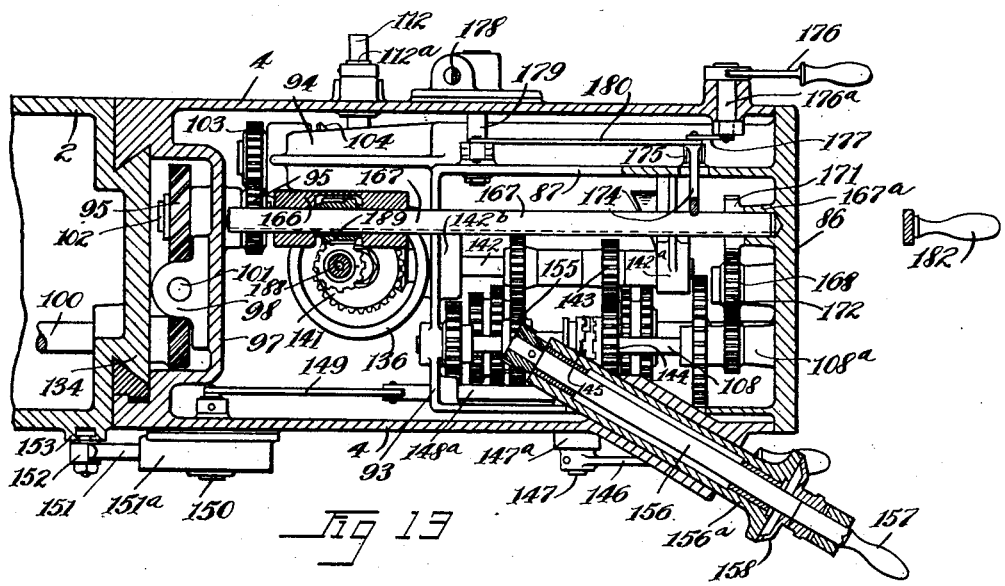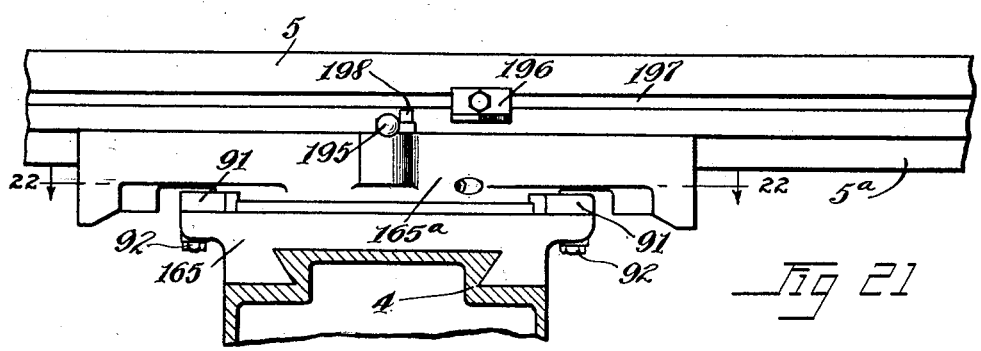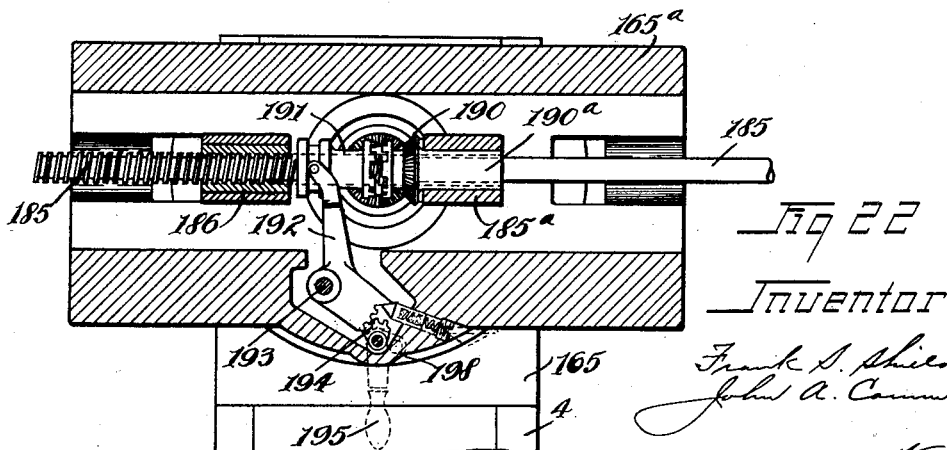

F. S. SHIELDS AND J. A. CAMM.
MACHINE TOOL.
APPLICATION FILED MAY 14, 1917.
1,387,517.
Patented Aug. 16, 1921.
13 SHEETS—SHEET 10.
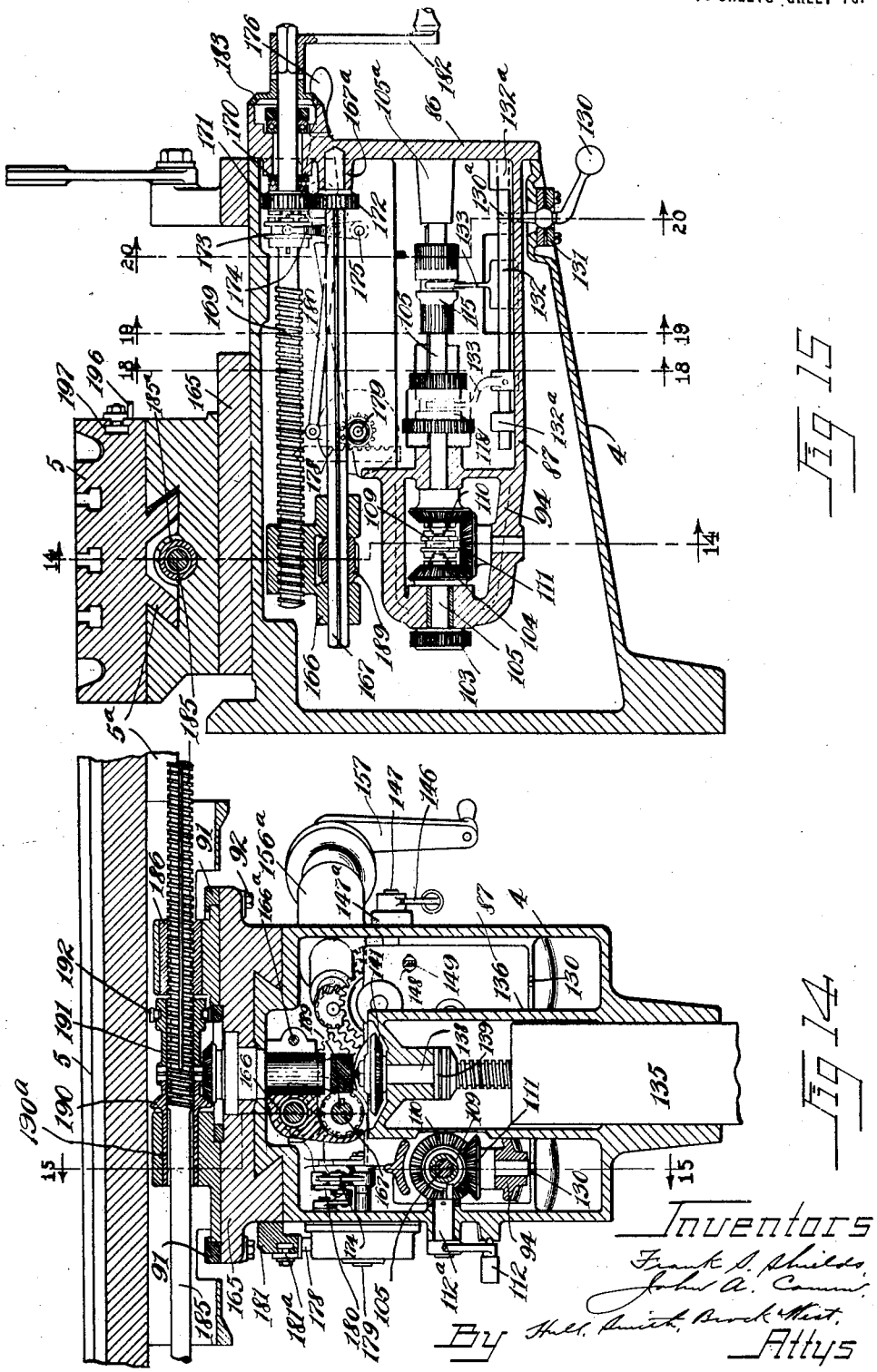

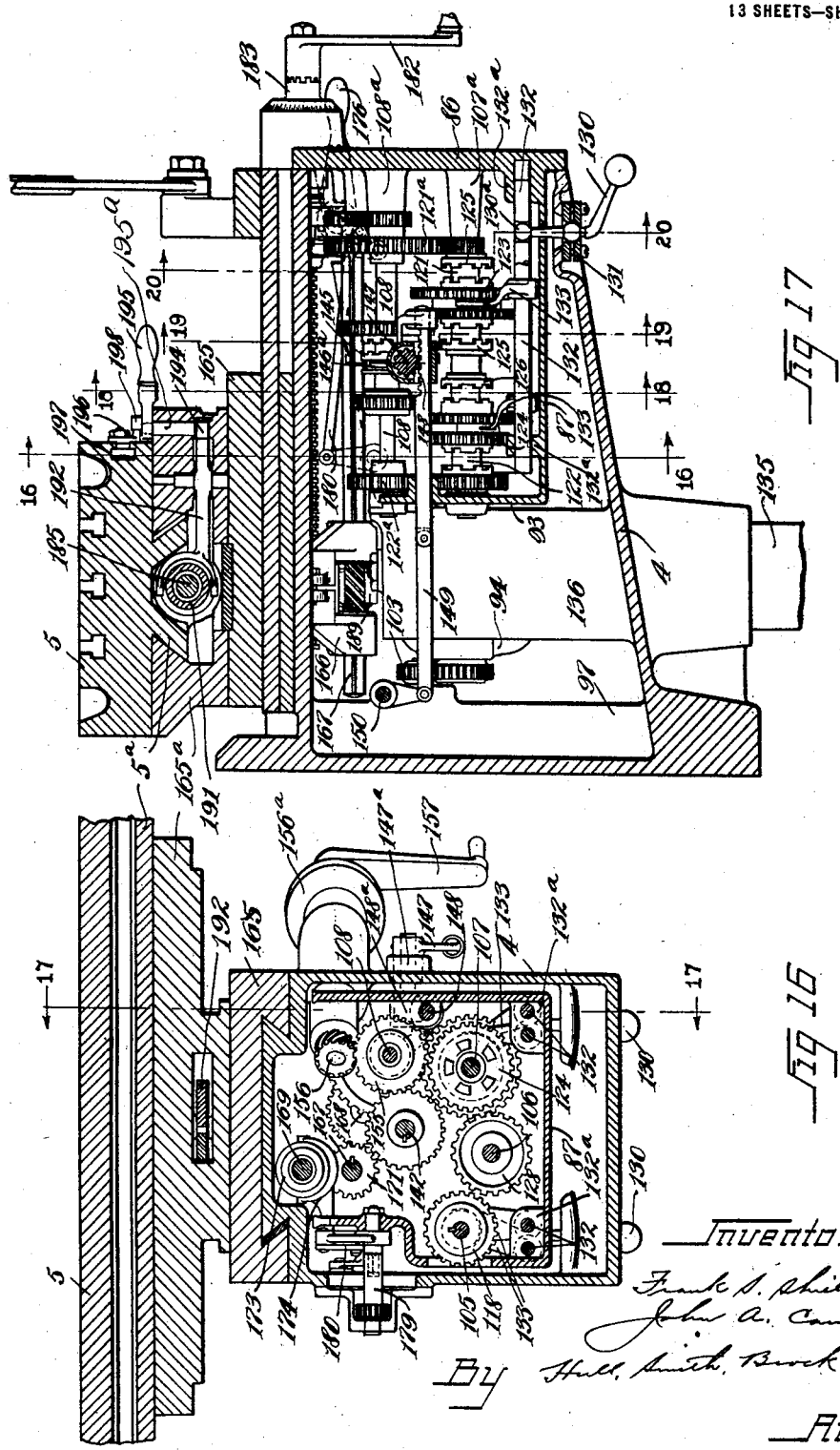

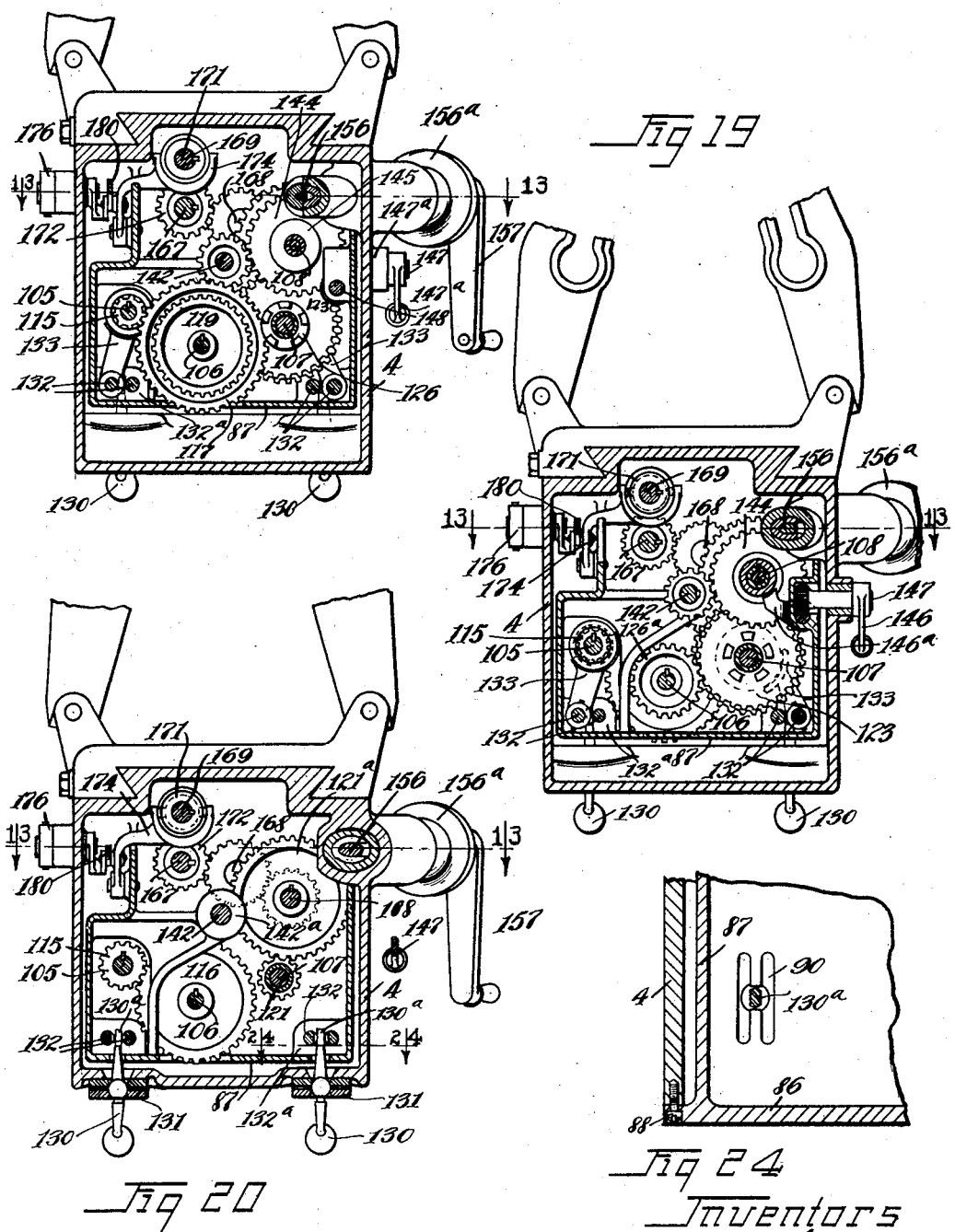

UNITED STATES PATENT OFFICE.

FRANK S. SHIELDS AND JOHN A. CAMM, OF CLEVELAND, OHIO, ASSIGNORS, BY MESNE ASSIGNMENTS, TO THE CLARK & MESKER MILLING MACHINE COMPANY, OF CLEVELAND, OHIO, A CORPORATION OF OHIO.

MACHINE-TOOL.

1,387,517.            Specification of Letters Patent.      Patented Aug. 16, 1921.

Application filed May 14, 1917. Serial No. 168,571.

*To all whom it may concern:*

Be it known that we, FRANK S. SHIELDS and JOHN A. CAMM, citizens of the United States, residing at Cleveland, in the county of Cuyahoga and State of Ohio, have invented certain new and useful Improvements in Machine-Tools, of which the following is a full, clear, and exact description, reference being had to the accompanying drawings.

This invention relates to machine tools, as for instance milling machines, and particularly to milling machines of the type having a column and a knee vertically adjustable thereon, the knee carrying an adjustable work table and the column carrying a spindle.

The invention resides in certain structural and operative improvements in machine tools, especially milling machines of the above noted type, whereby the machines as a whole better and more efficiently perform their functions, and the component parts thereof are greatly simplified and may be more easily and quickly assembled.

An important feature of the invention resides in improvements in the overhanging arm and arm support for carrying the outer bearing of the spindle arbor, these improvements including an arm of non-circular cross section whereby the same may be more surely and non-rotatably locked in the adjusted position. More specifically the arm is preferably of a square cross section and is anchored in similarly shaped openings in the column walls. These openings may be formed in the column walls in any convenient manner, but in accordance with this invention the column is provided with a removable cap and the cap and column are formed with complementary channels for the reception of the non-circular arm. These complementary channels are preferably V-shaped, and special clamping devices are provided for fixing the arm in the adjusted position.

Another important feature of the invention resides in forming the knee into a hollow casing, preferably totally inclosed, and in the location of the variable power transmission devices within this hollow knee. The hollow knee casing has a removable end closing plate which carries preferably integrally therewith, a supporting frame work for the variable power transmission devices, thus contributing toward simplicity in the parts and easy assembly thereof. The supporting frame work comprises an open top box like structure or casing for the reception of the transmission devices.

Other improved features reside in the means for supporting the knee, said means including a novel housing for the knee elevating screw; means for driving the feed mechanism in the knee and the arrangement of said mechanism within the knee; the means for giving either transverse or longitudinal movement to the work-table at the will of the operator; the means for adjusting the knee, including the means for making such adjustment either by hand or from the power shaft, at the will of the operator; improved variable speed gearing and speed control devices whereby the speed may be accurately controlled; new and improved devices for driving the spindle or feeding the work-carrying table, whereby, a more perfect control than has hitherto been possible is accomplished; an improved sliding gear transmission system; the arrangement of the variable power or speed control devices for the feeding operations into a compact form and the location of the same within the above noted knee-housing whereby the driving devices are entirely inclosed and only the hand controlling-levers for shifting the gearing are exposed; improved hand manipulated devices for controlling the operation of the machine, these devices including shifting levers mounted on ball and socket joints; improved devices for interrupting the automatic feed at predetermined times during the feeding operation; an improved safety friction clutch to avoid injury through accidental jamming of the machine; improved means for adjusting the spindle arbor by hand; means for interlocking the safety clutch with the spindle-adjusting devices whereby the machine cannot be started while the spindle is being adjusted, or the adjusting devices cannot be brought into operation while the machine is operating; and a new and improved arrangement of devices for supplying cutting lubricant to the cutting tools during the operation of the machine.

Figure 2:
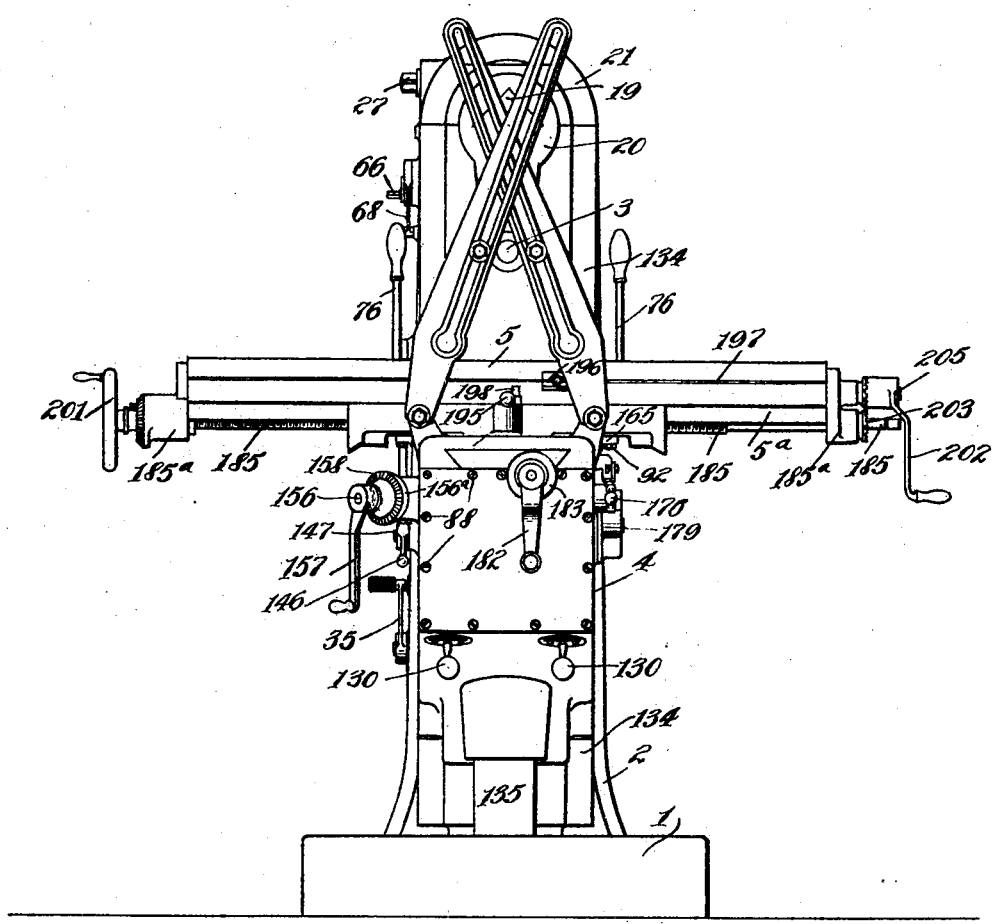
Figure 23:
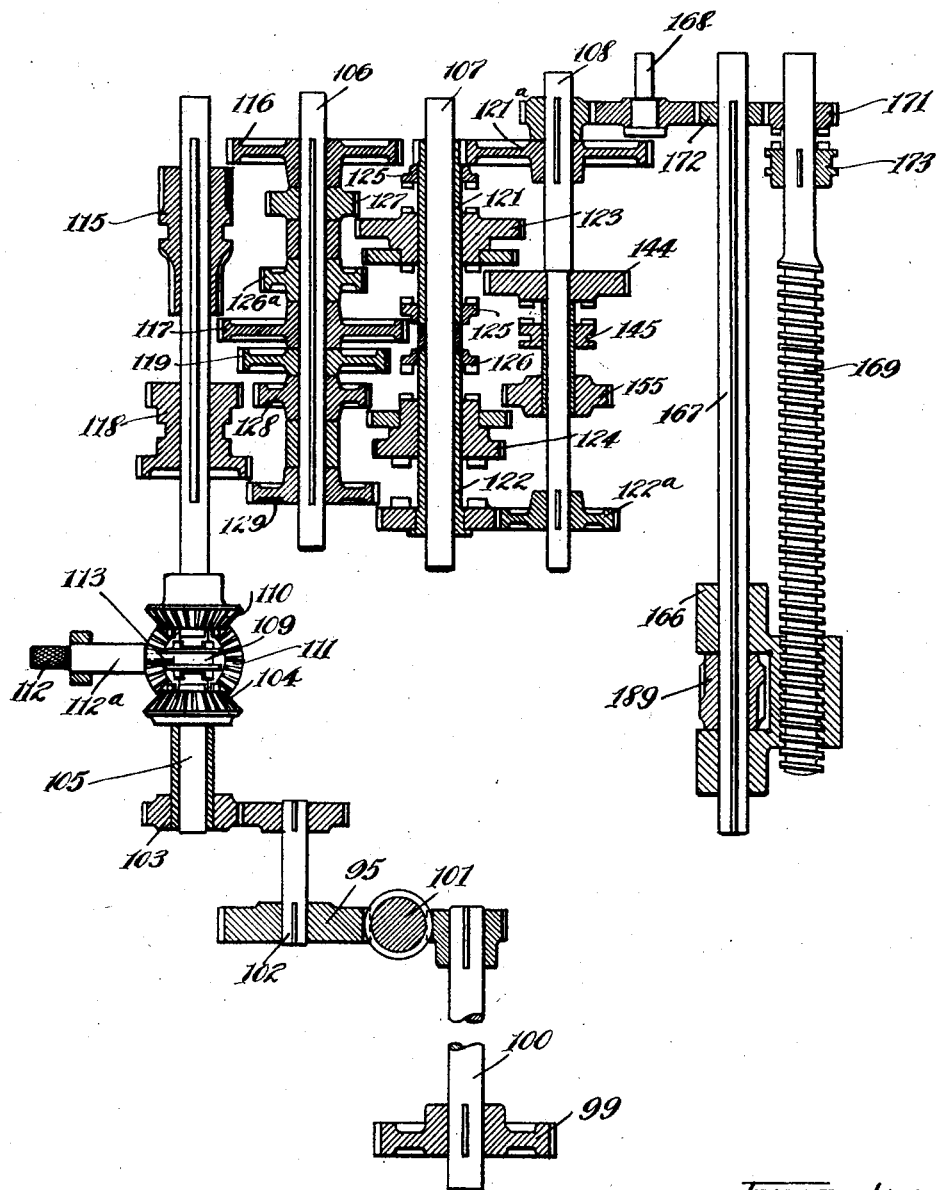

For a better understanding of the above noted features and other novel features which will hereinafter appear reference may be had to the accompanying drawings wherein—Figure 1 is a side elevation of a milling machine embodying this invention; Fig. 2 is a front view thereof; Fig. 3 is a longitudinal sectional view taken through the column of the machine; Fig. 4 is a sectional view on the line 4—4 of Fig. 3; Fig. 5 is a similar sectional view on the line 5—5 of Fig. 3; Fig. 6 is a similar sectional view on the line 6—6 of Fig. 3; Fig. 7 is a perspective view of the safety clutch; Fig. 8 is a perspective view of a portion of the locking devices for locking the clutch in neutral position; Figs. 9 and 9$^a$ are sectional views on the respective lines 9 and 9$^a$ of Fig. 5 through the shifting lever mounting; Fig. 10 is a side elevation of the knee; Fig. 11 is a central longitudinal section through the knee; Fig. 12 is a section through the knee on the line 12 on Fig. 11; Fig. 13 is a horizontal section through the knee on the line 13 of Figs. 12—18—19—20; Fig. 14 is a vertical section through the knee on the line 14 of Fig. 15; Fig. 15 is a longitudinal vertical section through the knee on the line 15 of Fig. 14; Fig. 16 is a vertical section through the knee on the line 16 of Fig. 17; Fig. 17 is a longitudinal vertical section through the knee on the line 17 of Fig. 16; Fig. 18 is a vertical section through the knee on the line 18 of Figs. 11—15—17; Fig. 19 is a vertical section on the line 19 of Figs. 11—15—17; Fig. 20 is a vertical section of the knee on line 20 of Figs. 11—15—17; Fig. 21 is a front view of the machine showing the automatically actuated devices for controlling the longitudinal feed of the table; Fig. 22 is a sectional view on the line 22 of Fig. 21; Fig. 23 is a view of the variable speed gearing driving connections and control devices, certain of the parts being illustrated in a conventional manner for convenience of illustration; and Fig. 24 is a view illustrating the H-slot for shifting levers, the view being taken on the line 24 of Fig. 20.

Referring to the drawings where like numerals designate similar parts of the machine throughout, the milling machine as a whole is mounted on a base 1 and comprises a column 2, a spindle arbor 3 carried thereon, a vertically adjustable knee 4 and a work table 5 carried by the knee. The arbor 3 is adapted to be driven through gearing and control devices hereinafter set forth from a power shaft 6, the power shaft 6 carrying on the overhanging end thereof a suitable pulley as illustrated.

The work-table 5 is capable of both longitudinal and transverse feed and the knee 4 is also capable of feed movements in a vertical direction, either of the feeding operations being procured by a mechanical drive from the shaft 6 or by hand at the will of the operator, all as will hereinafter appear.

The column 2 comprises a rectangular casing and the lower part of this casing forms a chamber 8 for the reception of a cutting lubricant, a centrifugal pump 9 being disposed therein for supplying a lubricant to the cutting tools during the operation of the machine. This pump 9 is mounted on the partition 10 between the lower chamber 8 and the upper chamber 11 of the column. The pump 9 comprises a hanger 12 whose upper end is securely anchored in an opening in the partition 10 and whose lower end terminates in a cylindrical casing 13 in which is disposed the rotary element of the pump. The hanger 12 may be inserted through the opening in the partition 10 from below and is provided near its upper end with an annular shoulder 14 for engagement with the under side of the partition 10, and for forming a tight seal a suitable washer or gasket 15 is disposed between the periphery of the hanger 12 and the partition 10. The hanger is securely clamped in position by means of a nut 16 coöperating with the externally threaded portion of the upper end of the hanger. The pump is driven by a vertically disposed shaft as illustrated which carries on its upper end a small pinion meshing with a larger pinion 17 on the main drive shaft 6 and the lubricant is drawn into the casing 13 from the chamber 8 and forced out through the outlet pipe 18, it being understood that the pipe 18 leads to the point or points where the lubricant is desired.

Referring to Figs. 4, 5, and 6, it is noted that the cutting lubricant may be supplied to lower chamber 8 of the column through an opening 8$^a$ formed in the wall just below the partition 10. A gate 8$^b$ is hinged to the wall and adapted to swing over to close the opening 8$^a$. This gate 8$^b$ carries integral therewith a trough-like structure 8$^c$ which in the open position of the gate serves as a funnel for filling the lower chamber with lubricant. It is noted that the partition 10 is offset in a vertical direction at a point adjacent the opening in order to clear the gate in the closed position.

The column is provided near its top with a longitudinally adjustable overhanging carrying arm 19 which carries on the outer end thereof a bracket 20 for supporting the bearing for the outer end of the arbor 3. This arm 19 is of a non-circular cross section, in the specific illustration shown a square cross section, and is received in the column 2 and in the bracket arm 20 by similarly shaped openings, thereby avoiding any tendency of the arm 19 to rotate in its support or the tendency of the bracket 20 to rotate on the arm 19. The column 2 is provided with a removable cap 21 for convenience in forming the guideways for the adjustable arm 19 and for convenience in assembling the parts.

The column has flanges or bridges 22 projecting inwardly from opposite sides thereof and the cap has similar flanges 23 coöperating therewith to support the arm 19. The flanges 22 on the column have formed therein registering V-shaped channels and the flanges 23 have coöperating inverted V-shaped channels, these channels forming a guideway for the adjustable arm 19. The sides of the channels are formed at right angles to each other and the dimensions are such that the arm 19 fits snugly therein. At the apex of the lower channel is formed a recess 22ª running throughout the channel, and a similar elongated recess 23ª is formed in the upper channel. The cap 21 conveniently has a vertical aperture therein registering with a similar aperture in the inwardly projecting walls 22 and these registering apertures are adapted to receive a centering pin 24 for accurately alining cap 21 in position. The cap 21 has disposed at right angles to the arm 19 two cylindrical members 25, the upper edge of the arm 19 projecting up into the cylinders as illustrated in Fig. 5. Disposed in this cylinder 25 are two opposed cylindrical clamping members 26 which are arranged on either side of the arm 19. A clamping screw 27 passes through the outer of these clamping members 26 and enters into a threaded aperture in the opposite clamping member for drawing the two members together and securely clamping the arm 19 in the adjusted position, the outer end of the screw 27 being adapted to receive a suitable wrench for this purpose and having a shoulder engaging the outer clamp 26. The cap 21 may be secured to the upper part of the column in any suitable way as by means of bolts 28. By means of the arrangement here provided the guideways and supports for the arm 19 may be easily and inexpensively formed and the arm 19 with its coöperating parts may be assembled or disassembled with the greatest facility and may be adjusted longitudinally of its length and securely clamped in position with a minimum of time consumed in the operations.

*Spindle drive.*

The spindle 3ª is adapted to be driven from the power shaft 6 by means of a novel variable speed gearing comprising a series of countershafts and coöperating pinions and clutches mounted above the drive shaft 6. The drive shaft 6, referring to Fig. 3, passes through the column 2 just above the partition wall 10 and is mounted in suitable bearings in the column casing, the left hand bearing 30 being attachable to and removable from the casing as illustrated. This shaft 6 carries loosely mounted thereon two pinions 31 and 32 and both of these pinions 31 and 32 are in mesh with an idler pinion 33. The shaft 6 also carries between the pinions 31 and 32 a clutch 34 which is slidably keyed thereto and capable of being thrown either to the left or the right to connect either of the pinions to the shaft for the purpose of reversing the direction of rotation of the machine. This clutch may be conveniently controlled by means of a fork 29 fixed to a shaft projecting out through the casing of the column 2 and a handle 35 connected to this shaft. The pinion 32 carries therewith a sleeve projecting rearwardly therefrom and this sleeve has slidably keyed thereto a safety friction clutch 37, this clutch 37 coöperating with a clutch 38 mounted loosely on the shaft 6 for driving the spindle arbor during the operation of the machine. The clutch 38 carries therewith a pinion which meshes with a pinion 39 keyed to a shaft 40 and this shaft 40 is capable of being connected to a shaft 41 arranged thereabove in four different gear ratios. The shaft 41 is likewise capable of being geared to the spindle 3ª by means of four gear ratios and by combining the two gear controls sixteen different speeds for the spindle arbor 3 in either direction of rotation are possible. These counter shafts are conveniently arranged all in a vertical plane and are journaled in suitable bearings 85 projecting inwardly from the column walls and the upper parts of the bearing structures are formed into a cup like shape 86 for retaining a quantity of lubricant therein. Suitable passageways lead down from these cups around the ends of the shafts for conducting lubricant thereto.

The gearing for connecting the shaft 40 with the shaft 41 with four different gear ratios comprises two double pinions 42 and 43 slidably keyed to the shaft 40 and four pinions 44, 45, 46 and 47 keyed to the shaft 41. The pinions 42 and 43 are termed "double pinions" because each of them comprises two pinions mounted on a common sleeve, and this term will be used throughout the specification to designate similar parts. The double pinions 42 and 43 are respectively provided with annular slots 42ª and 43ª for the reception of straddling operating forks and are shiftable either to the left or the right into meshing engagement with one of these four pinions. For instance upon shifting the pinion 42 to the left into meshing engagement with the pinion 44 one speed ratio is obtained; upon shifting the pinion 42 to the right into meshing engagement with the pinion 45 a second speed ratio is obtained; upon shifting the pinion 43 to the left into mesh with pinion 46, a third speed ratio is obtained; and shifting the pinion 43 to the right into mesh with the pinion 47 a fourth speed is obtained between the driving shaft 40 and the countershaft 41.

The variable ratio gearing between the shaft 41 and the spindle 3ª comprises a shaft 49, two rotary elongated sleeves 50 and 51, mounted on either end of said shaft, and two loosely mounted double pinions 52 and 53 shiftable lengthwise of the sleeves 50 and 51 and clutchable thereto. The sleeve 50 is permanently geared to the spindle 3ª through two meshing gears 54 and the sleeve 51 is likewise permanently geared thereto through a big pinion 55 on the spindle 3ª and a smaller meshing pinion on the sleeve 51. By shifting the double pinion 52 to the left it is brought into meshing engagement with the pinion 44 on the shaft 41 and at the same time into clutching engagement with a coöperating clutch on the pinion 54. By shifting double pinion 52 to the right it is brought into mesh with pinion 56 on shaft 41 and simultaneously into clutching engagement with clutch 57 keyed to the sleeve 50; by shifting double pinion 53 to the left it meshes with pinion 58 on shaft 41 and at the same time engages the clutch 59 on the sleeve 51; and by shifting double pinion 53 to the right it meshes with pinion 60 on shaft 41 and at the same time engages clutch 61 on sleeve 51. Four different speed ratios between shaft 41 and spindle 3ª are thus possible and it is apparent that sixteen different speed ratios may be obtained between the drive shaft 6 and spindle 3ª inasmuch as each of the four speed ratios between the shafts 40 and 41 is capable of coöperating with four different speed ratios between the shaft 41 and the spindle 3ª.

The shifting of these double pinions to the left and the right is accomplished by means of two shifting levers 48 each of which is adapted to occupy any one of four operating positions, each position corresponding to one particular speed ratio. The operating forks straddling the sleeves upon which the double pinions are mounted are indicated at 62. The levers 48 and forks 62 and their operating connections are conveniently mounted on a removable plate 63 (see Fig. 9), this plate being secured to the column casing in any suitable manner as by means of the screw bolts illustrated in the drawing. The plate 63 carries in the opening in the column wall inwardly projecting structures 63ª in which structures are mounted the plungers 62ª, these plungers being mounted for horizontal sliding movement in longitudinal chambers formed therein. There is arranged a pair of these plungers for each pair of double pinions 42, 43 and 52, 53, and each operating lever 48 projects inwardly through a passage in the structure 63ª and plays between the plungers of a pair. These levers are mounted on the plate 63 by means of ball and socket connections 63ᵇ and the inner ends thereof may be caused to engage the plungers 62ª to slide them in either direction, suitable opposed recesses 62ᵇ being provided on the plungers of a pair into which the lever is adapted to enter for engagement with either of the plungers. The operating forks 62 may be secured to the plungers 62ª in any suitable manner but are preferably cast integral therewith. The structures 63ª receive closing plates 63ᶜ for closing the chamber in which slide the plungers 62ª, the plate 63 and structures 63ª being preferably cast into one integral piece. For preventing the simultaneous operation of two double pinions by a lever 48 there is provided an H-slot in the closing plate 63ᶜ for each lever, these levers having inwardly extended portions 48ª which play in these slots. By this arrangement the levers have to be rocked in a vertical plane before they may be shifted to the right or the left.

*Spindle adjustment.*

For accurately adjusting the spindle arbor 3, hand control devices are provided comprising a pinion 64 mounted on the spindle 3ª meshing with a worm 65 which is mounted on a shaft 66, the shaft 66 being provided on either end with means for receiving a suitable wrench or other tool for rotating the shaft 66 and thereby through the gearing indicated adjusting the angular position of the spindle 3ª. The shaft 66 with its pinion 65 is eccentrically mounted on a rock shaft 67 passing through the column casing and mounted in suitable bearings therein and on an overhanging end of this shaft 67 is provided an operating handle 68 for rotating the shaft 67 and thereby throwing the worm gear 65 out of mesh with the pinion 64. In Figs. 3, 4, 5 and 6 the worm 65 is shown in mesh with the spindle 64 and under these conditions it is desirable to lock the clutch 37 on the main drive shaft 6 in a neutral position to avoid the starting of the machine while the spindle is being adjusted. A locking arrangement is therefore provided between the shaft 67 and the clutch 37 which comprises a disk 69 keyed to the shaft 67 and a series of coöperating connections between this disk and the clutch. The disk 69 is provided on its periphery with an annular flange 70 projecting outwardly at right angles thereto but this flange 70 does not extend all the way around the disk, a portion thereof being cut away as indicated at 71 in Fig. 3 and Fig. 8. This flange 70 coöperates with a locking member 72 which is provided with a coöperating flange 73 forming the arc of a circle and projecting toward the disk 69. A slot 74 is formed in this flange 73 and with the clutch 37 on the drive shaft 6 in neutral position this slot 74 registers with the flange 70 on the disk 69. In Fig. 8 the locking member 72 corresponds to the operating position of the clutch 37 and in this position the slot 74 does not register with the flange 70 on the disk 69 and accordingly the flange 73 is in the path of the flange 70 and therefore obstructs and prevents the turning of the shaft 67 to bring the worm 65 into mesh with the pinion on the spindle arbor. In Figs. 3, 4, 5 and 6 however the worm 65 is illustrated as being in mesh with its coöperating pinion and in this position the locking member 72 corresponds to the neutral position of the clutch 37 in which position the slot 74 registers with the flange 70; and by the rotation of the disk 69 the flange 70 is caused to enter the slot and thereby lock the locking member 72 into its neutral position until the shaft 67 and the disk 69 are again rotated to bring the worm 65 out of mesh. The locking member 72 forms one member of a bell crank lever pivoted to the control shaft 75 to which is keyed also the hand control lever 76. The other member of the bell crank lever is connected by means of a link 77 with a bell crank lever 78 pivoted at 79. The second member of the latter bell crank lever comprises a fork 78ª operatively connected with the safety clutch 37 hereinafter described. By turning the operating lever 76 in a counter-clock direction the clutch 37 may be caused to engage the coöperating clutch and pinion 38 for operating the machine.

The safety friction clutch 37 is illustrated on an enlarged scale in Fig. 7 and comprises a friction drum 80, preferably of machine steel keyed to the sleeve of pinion 32 and having on the opposite faces thereof two fiber disks 84 and two coöperating heads 81 and 82, the heads 81 and 82 being adapted to be drawn over the ends of the drum and clamped together by bolts 85 passing through registering apertures near the peripheries of the heads. An annular flange 83 is provided on the head 81 for entering a corresponding recess in the head 82 when the heads are clamped together. The head 81 has a hub with an annular slot on its exterior for the reception of the clutch operating fork 78ª and the head 82 has a clutch member on its face coöperating with the clutch member 38. The head 82 is preferably of hardened machine steel and head 81 may be of cast iron.

The compartment above the partition 10 is partially filled with a lubricating oil, as for instance to the level on line a—a of Fig. 3 just below the shaft 41. The gears on this shaft therefore dip down in the oil and during the operation of the machine convey the lubricant to the gears thereabove on shaft 49 and spindle 3ª. The lubrication of the shafts and gears above the oil is entirely satisfactory, rendering it unnecessary to flood the whole compartment.

*Table feed drive.*

The knee 4 is formed of a hollow casing, the bottom wall thereof tapering upwardly toward the outer end, and an end closing plate 86 being provided to form a totally inclosed casing. The main part of the casing 4 may be cast in one piece together with the dovetail guideways and other appurtenances hereinafter set forth. The end closing plate 86 carries, preferably cast integrally therewith, an inwardly projecting supplementary casing 87 having bottom and side walls, and directly on and within this supplementary casing as a frame work are mounted the bearing structures for the variable power transmission devices hereinafter set forth. The end plate 86 together with the frame work 87 and other parts may be assembled with ease and speed, and may be fixed in position as by bolts 88 passing through the end plate and entering recesses in the end of casing 4.

By this arrangement the variable power gearing and control devices for the feed movements are totally inclosed in and housed by the hollow knee 4 and in order to facilitate the housing these various control devices are embodied in a compact arrangement hereinafter set forth.

The power for the various feed movements of the table 5 is transmitted from the driven shaft 6 through a shaft 100 passing through the column 2 and rotating in suitable bearings in the column walls. The driving connection between the shaft 100 and the power shaft 6 comprises a gear 99 on shaft 100 meshing with a pinion 96 on the sleeve of gear 38, so that the clutch 37 controls the feeding movements of the table simultaneously with the control of the spindle drive and acts as a safety device for all the machine drives. A vertically disposed elongated spiral gear 101 is adapted to mesh with a small pinion on the overhanging end of the shaft 100 in all vertical positions of the knee 4, this spiral gear being mounted on bearings 98 carried by the inner wall 97 of the casing 4 adjacent the dovetailed guideway on the column. The spiral gear 101 meshes with a pinion 95 on a stub axle 102, the latter being journaled in and passing through the wall 97. The driving connections are conventionally illustrated in Fig. 23 and upon reference to this in connection with the other drawings it will be seen that the pinion on the opposite end of the stub shaft 102 meshes with a pinion 103 which is loosely mounted, together with a beveled pinion 104 on a horizontal shaft 105, both pinions 103 and 104 being fixed to a common sleeve rotatable on the shaft 105. The shaft 105 is journaled at its forward end in a bearing 105ª on the end plate and at its rearward end in a yoke like structure 94 formed integral with the casing 87. The power is transmitted through the shaft 105 to the various feed devices through a gearing system similar to the gearing for the spindle drive above described. For reversing the direction of the feeding movements a clutch 109 is splined to the shaft 105 and disposed between the beveled gear 104 and a loosely mounted bevel gear 110, there being an idler bevel gear 111 meshing with the two beveled pinions (Figs. 15 and 23). The clutch 109 may be shifted over into engagement with either of the loosely mounted pinions 104 and 110 for the purpose of driving the shaft 105 in either direction of rotation. This clutch is conveniently shifted over from one position to another by means of a hand lever 112 attached to a rock shaft 112ª passing through the casing 4 and having a suitable fork connection 113 with the clutch 109.

The variable speed gearing for the feed movements of the table is of the sliding gear transmission type above described in connection with the spindle drive and comprises a series of counter shafts 105, 106, 107, and 108. The shafts 106, 107, and 108, like shaft 105, are conveniently horizontally disposed and journaled at their forward ends in bearings 106ª, 107ª, and 108ª cast with the end plate. At their rearward ends these shafts are journaled in bearings formed in a vertical end wall 93 integral with the casing 87. These parallel counter shafts, as will be noted, are not arranged in a common plane like the transmission above described in connection with the spindle drive, but are brought together in a compactly arranged manner to accommodate the transmission to the chamber within the casing 87, the shafts being positioned with reference to each other and the gears being positioned thereon in such a manner as not to interfere with each other in their operation, as will hereinafter appear.

The shaft 105 may be geared to the shaft 106 in four different speed ratios. A sleeve 115 having a pinion on either end thereof is keyed to the shaft 105 and slidable in one direction to mesh with the pinion 116 keyed to shaft 106 and in the other direction to mesh with the pinion 117 keyed to the shaft 106. This sleeve with the two pinions thereon may be conveniently termed a "double pinion." In like manner another slidable sleeve 118 with two pinions thereon (or double pinion) may be slid along the shaft 105 in the one direction to mesh with a pinion 119 and in the opposite direction to mesh with a pinion 129 keyed to the shaft 106. In a similar manner the shaft 106 may be connected with the shaft 108 in four different speed ratios. This is accomplished by shiftable gears and clutches on the intermediate shaft 107. This shaft 107 carries thereon two elongated sleeves 121 and 122, one of these sleeves being permanently geared to the pinion 121ª on the shaft 108 and the other sleeve being permanently geared to the pinion 122ª on the shaft 108. Loosely mounted on the sleeves are double pinions 123 and 124, the pinion 123 being shiftable back and forth between clutches 125 fixed to the sleeve 121, and the pinion 124 being shiftable back and forth between the clutches 126 fixed to the sleeve 122. Upon shifting the double pinion 123 in one direction it simultaneously meshes with pinion 126ª on the shaft 106 and engages a clutch 125 while the shifting of the pinion 123 in the opposite direction causes it to mesh with another pinion 127 on shaft 106 and at the same time engages the outer clutch 125. The double ended pinion 124 may likewise be shifted in one direction to mesh with pinion 128 and simultaneously therewith engage a clutch 126 on the sleeve on the other end of shaft 107 and by shifting this double ended pinion in the opposite direction it is thrown into mesh with the pinion 129 on shaft 106 and at the same time is clutched to the sleeve. When one of the double pinions 123 and 124 is in the operating position, it is understood that the other one of these double pinions is in the neutral position the sleeve thereof freely rotating without transmitting power.

The double pinions 115, 118, 123 and 124 may be shifted back and forth in any convenient manner, as for instance, by means of hand controlled levers 130, these levers being fixed on removable plates 131 in openings on the bottom of the knee casing 4 near the outer end thereof. One of these levers is operatively connected with shiftable double pinions 115 and 118 while the other is operatively connected with the shiftable double pinions 123 and 124. The operative connections between each lever and its pair of double pinions consists of two parallel arranged longitudinally slidable rods 132 carrying forks 133 (Fig. 15) straddling the double pinions. The rods are reciprocable in bearings 132ª formed in the bottom of casing 87. Each lever forms intermediate its ends a ball and socket connection with the removable plate 131 whereby the same may be oscillated in any direction. The rods 132 are arranged closely adjacent each other and the upper end 130ª of the lever projects up between the rods and plays in opposed recesses formed in the adjacent sides of the rods. The levers in their neutral positions may be rocked transversely of the rods 132 to enter the recess of a rod and thereby engage it to shift the same in either direction. An H-slot 90 is provided in the casing 87 for each lever, wherein the lever plays back and forth during the shifting operations. It is thus observed that by the manipulation of the hand levers 130 the various speed changes may be accomplished, each lever occupying any one of four different positions and all possible combinations giving sixteen different speed ratios between shafts 105 and 108.

Vertical feed.

The knee 4 is vertically adjustable along a dove-tailed guideway 134 on the column which insures the proper alinement of the knee at all times. The knee as a whole is supported on a hollow pillow 135, the pillow 135 resting directly on the base 1 of the machine. The knee casing has formed therein, preferably integrally therewith, a vertical cylindrical casing 136 which is adapted to fit snugly around the pillow 135. This cylindrical structure 136 projects up into the knee casing and extends to a point near the top thereof, this member 136 being located rearwardly of the vertical wall 93 and centrally of the knee casing, and it being noted that the yoke 94 passes between the member 136 and a side wall of the knee casing. The upper end of the cylinder is closed by a supporting structure comprising a bearing 137 for the elevating feed shaft 138. The feed shaft 138 is provided with a shoulder 139 which abuts against the bearing 137 for assuming the weight of the knee and taking care of the thrusts during the operation of the machine. There is preferably provided between the shoulder 139 and the bearing 137, a ball bearing for securing frictionless rotation. The lower part of the shaft 138 is provided with a spiral screw thread with which coöperates an internally threaded sleeve 140 supported within an annular shoulder on the interior of the hollow pillow 135. The knee may be lowered or raised by rotating the shaft 138. For this purpose there is provided on the upper end of the shaft 138 a beveled pinion 141 meshing with a similar pinion on a shaft 142, this shaft being journaled at one end in a bracket 142$^a$ projecting from one side of casing 87 (Figs. 11 and 13) and at the other end in a bearing 142$^b$ carried by the vertical wall 93. This shaft 142 may be driven from the shaft 108 or it may be driven by hand to accomplish the vertical feed. On this shaft 142 is fixed a pinion 143 which meshes with a larger pinion 144 running loosely on the shaft 108 and the mechanical feed is accomplished by clutching the loose pinion 144 to the driven shaft 108. For this purpose a clutch 145 (Figs. 17, 19 and 23) slidably keyed to the shaft 108 is provided which may be actuated by a hand controlled lever 146 mounted on a rock shaft 147. This rock shaft 147 is journaled in a bearing 147$^a$ on the side wall of casing 4 and carries on its overhanging end a pinion meshing with a rack 148, and to this rack is fixed the fork 146$^a$ which controls the clutch 145. This rack 148 is elongated and extended toward the column 2, the rack being slidable in one bearing (Fig. 17) formed in the vertical wall 93 and in another bearing 148$^a$ formed in an offset part of the side wall of casing 87. A link connection 149 is pivoted to the free end of the rack and is operatively connected with a rock shaft 150 through a crank arm, the rock shaft passing through a side of casing 4 and being journaled therein. This rock shaft 150 carries a pinion on its overhanging end which meshes with a rack 151, the rack 151 being slidably mounted in a frame work or casing 151$^a$ for movement in a horizontal direction and having its free end projecting into the path (Figs. 1 and 13) of an adjustable actuating roller 152 carried by the column 2. The roller 152 is mounted in vertical guideways 153 and by setting this actuating roller 152 at a predetermined point the vertical feed of the knee may be automatically stopped through the engagement of the rack 151 with the roller 152, thus causing the rocking of the shaft 150 and the consequent release of the clutch 145 through the connections just described.

The vertical feed may be also accomplished by hand, as above noted, and for this purpose a loosely mounted spiral gear 155 is carried by shaft 108 and this meshes with a similar gear keyed to the shaft 142 (Figs. 13 and 23). This gear 155 also meshes with a spiral pinion on the end of hand controlled shaft 156 which projects out through the side of the casing of the knee and is adapted to be actuated by a handle 157. The shaft 156 is journaled in a sleeve 156$^a$ which fits in a cylindrical chamber formed through the side wall of the casing 4 and arranged at an angle thereto. The outer end of the shaft has keyed thereto a graduated plate 158 and coöperating clutch members are provided on the hub of the plate and on the handle whereby the handle may be clutched to or disengaged from the shaft 156 at the will of the operator.

The hollow knee casing 4 may be partially filled with a lubricant in a similar manner to the flooding of the lower parts of the transmission devices in the column above described. The level of the lubricant is indicated by the line b—b on Fig. 11, it being understood that lubricant is conveyed to the shafts and gears thereabove by the intermediate gears which receive the oil from the flooded gears. The lubrication is entirely satisfactory notwithstanding the low level of the oil. The hollow pillow 135 is also preferably filled with a lubricating oil whereby the elevating shaft and coöperating nut 140 are flooded.

Transverse feed.

The table 5 is mounted on a saddle 165 which is adjustably mounted for movement longitudinally of the knee 4 for accomplishing the transverse feed of the table, this saddle 165 having a dovetailed groove into which fits a correspondingly shaped runway on the knee 4. The saddle 165 carries downwardly depending therefrom a bearing structure 166 (Fig. 15), more particularly described hereinafter, and in the bearing 166 is rotatably mounted one end of a shaft 167, the other end of the shaft 167 being journaled in a bearing 167ª on the end wall of the end plate 86. This shaft 167 is geared to the shaft 108 through an intermediate stub shaft 168 journaled in the removable end plate (Fig. 13) and is continuously rotated with the shaft 108 during the automatic feed operations. Mounted just above the shaft 167 is the screw feed shaft 169 for the saddle, the screw threaded portion of this shaft coöperating with a screw threaded opening in the upper part of the bearing structure 166 to feed the saddle 165 back and forth during the operation of the machine. The other end of the shaft 169 is journaled as by means of the ball bearings 170 in the end plate of the knee casing 4 and carries a pinion 171 loosely mounted thereon which meshes with a pinion 172 on shaft 167. The shaft 169 also carries a clutch 173 splined thereto and having operating forks 174 for throwing in and out the clutch, the pinion 171 having clutch teeth thereon coöperating with the clutch 173. The forks 174 are pivotally mounted at 175 to a side wall of casing 87 and an operating handle 176 is provided for actuating the clutch 173 for controlling the transverse feed of the table, the handle 176 being connected to a rock shaft 176ª journaled in a side wall of the casing 4. The rock shaft carries on its inner end a crank arm which is connected to the fork 174 by means of a link 177. The clutch 173 may also be controlled automatically through a mechanism comprising a rack 178 mounted for vertical movement on the knee 4 and meshing with a pinion on a shaft 179, the shaft 179 passing through the side wall of casing 4 and being connected by means of a crank arm and link connection 180 on its inner end with the operating fork 174. A frame 181 is mounted on the saddle 165 and has a horizontal runway therein for the reception of an adjustably mounted cam 181ª which may be set at any predetermined point along the frame in a position to engage the upper end of the rack 178 to cause a depression thereof and through the pinion and the link connections the releasing of the clutch 173. The shaft 169 may be rotated by the handle 182 for feeding the saddle back and forth by hand. When the automatic feed is being used this handle may be disengaged from the end of the shaft 169 by means of coöperating clutch members formed on the hub of a graduated plate 183 keyed to the shaft 169 and on the hub of the handle.

*Longitudinal feed.*

The saddle 165 carries thereon a swiveled head 165ª on which is mounted the table; and the saddle and swiveled head have flat bearing surfaces and are centered with reference to each other by means of an annular ring 90 (Fig. 14), this ring playing in similarly formed registering recesses on the top of the saddle and on the bottom of the head. The table may thus be swiveled around at various angles to the knee within certain limits. Suitable clamps 91 are provided around the periphery of the swivel head 165ª for fixing the head in the required angular position, these clamps being secured in position by bolts 92 passing through apertures in ears formed on the outer edge of the saddle 165.

The table 5 is adjustable in the swivel head 165ª in a direction longitudinally of its length, and in the usual manner has a dovetail member 5ª which runs in a correspondingly shaped groove formed in the head. The dovetail guide 5ª is hollowed out longitudinally thereof (Fig. 15) into an inverted trough like shape for the passage therethrough of a feed screw shaft 185, this shaft being journaled in bearings 185ª depending from the ends of the table. The shaft has a portion thereof provided with spiral threads and this portion coöperates with a stationary nut 186 (Figs. 14 and 22) fixed in a lug projecting upwardly from the bottom of the dovetail groove in the head, the shaft being adapted to be rotated by gearing devices to be described. The gearing comprises a vertically disposed shaft 188 (Fig. 11), passing upwardly through the top of casing 4 and through the saddle 165 to a point just beneath the feed shaft, this vertical shaft being located on the axis of the swivel head 165ª. This shaft 188 is journaled in a sleeved bearing which in turn is mounted in a sleeve 188ª, this sleeve 188ª having on its upper end an annular flange 188ᵇ resting in an annular recess formed in the head 165ª around the central axial opening therein. On its lower end, the vertical shaft 188 carries a pinion meshing with a pinion 189 on shaft 167, and the pinion 189 is slidably keyed to the shaft 167 to follow the feed movements of the saddle, so that in all positions of the saddle the vertical shaft 188 is geared to the shaft 167. The sleeve 188ª supports the depending structure 166, the latter having two lugs between which is disposed the pinion 189 and in which the shaft 167 is journaled. The member 166 has a cylindrical opening therein and is split in a vertical direction on one side thereof and has coöperating ears on opposite sides of the slit for the reception of a clamping bolt 166ª. The parts may be assembled by inserting the sleeve 188ª through the opening in the member 166 and then tightening bolt 166ª to clamp the two members together. The shaft 188 carries on its upper end a bevel pinion which meshes with a similar pinion 190, the latter being fixed to a sleeve journaled in a bearing 190ᵃ projecting up from the bottom of the dovetail groove in the head 165ᵃ. The feed shaft 185 passes loosely through this pinion 190 and may be clutched thereto by means of a clutch 191 which is splined to the shaft. This clutch 191 is operable through a fork 192 forming one arm of the bell crank lever (Fig. 22) pivoted at 193. The other arm of this lever has provided on the end thereof a section of the gear teeth which meshes with a sector pinion 194 controlled by a handle 195. The bell crank lever and sector pinion are mounted for horizontal movement in a chamber provided in the head 165ᵃ and the handle is mounted on the upper end of a vertical shaft 195ᵃ. By manipulating this handle 195 and therethrough the bell crank lever, the clutch 191 may be engaged or disengaged from the pinion 190 thereby controlling the mechanical feed of the table. The disengagement of the clutch 191 may also be brought about automatically by adjusting a cam 196 at a predetermined point along the runway 197 on the table. An actuating cam 198 fixed to the handle 195 and projecting into the path of the cam 196 coöperates therewith to cause the automatic disengagement of the clutch at the proper time.

The table may be fed longitudinally by hand from either end of the shaft 185, a hand wheel 201 being provided on the screw threaded end of the shaft for this purpose and a handle 202 on the other end of the shaft for a like purpose. This latter handle has a clutch 203 for engagement or disengagement from the shaft 185 at the will of the operator. For procuring a fast feed a stub shaft 205 is mounted in the bearing 185ᵃ just above the clutch 203, and this stub shaft 205 is connected to the feed shaft by gears 206, shown in dotted lines in Fig. 12. The handle 202 may be inserted on the overhanging end of the stub shaft and clutched thereto in a manner similar to that illustrated in connection with the feed shaft.

While we have set forth our invention in the specific manner required by the patent statutes, and as embodied in a particular type of milling machine, it is understood that certain features of the invention are applicable to other types of machine tools and the claims annexed hereto should not be restricted to the specific devices set forth, except as is specifically specified therein or is rendered necessary by a consideration of the prior art.

Having thus described our invention, what we claim is:—

1. In a milling machine, the combination of a vertically disposed hollow column and a knee vertically adjustable thereon, said knee being formed of a hollow casing and containing therein variable power transmission devices for adjusting said knee.

2. In a milling machine, the combination of a column, a knee, said knee being formed of a hollow casing, a saddle adjustable longitudinally of said knee, a work table adjustable longitudinally of said saddle and carried thereby, and variable power transmission devices contained in said hollow knee for feeding said saddle and said table.

3. In a milling machine, the combination of a column, a knee vertically adjustable on guideways formed on said column, said knee being formed of a hollow casing, a work table adjustable for transverse and longitudinal feed movements thereof and mounted on said knee, and variable power transmission devices contained in said hollow knee for feeding the knee and the table.

4. In a milling machine, the combination of a column and a knee vertically adjustable thereon, said knee being formed of a hollow casing and containing therein variable speed power transmission devices for adjusting said knee.

5. In a milling machine, the combination of a column and a knee vertically adjustable thereon, said knee being formed of a hollow inclosed casing and containing therein a variable power transmission system of gearing.

6. In a milling machine the combination of a column carrying a drive shaft, a knee formed of a hollow casing and vertically adjustable on guideways on the column, a vertically disposed elongated gear mounted on the knee adjacent the guideways and adapted to be geared to said drive shaft in all vertical positions of the knee, a screw shaft for adjusting said knee and a multi speed gearing interposed between the screw shaft and the elongated gear and located within the knee casing.

7. In a milling machine the combination of a column having disposed therein a drive shaft, a knee comprising a hollow casing and vertically adjustable on guideways formed on the column, a vertically disposed elongated gear mounted in a chamber within said knee and journaled in bearings on the walls of said knee, said gear being disposed adjacent an end of said drive shaft and adapted to mesh with a pinion on said drive shaft in all vertical positions of the knee, a screw shaft for vertically adjusting the knee and a multi speed ratio gearing interposed between the screw shaft and the elongated gear and located within the knee casing.

8. In a milling machine, the combination of a column having journaled therein a drive shaft, a knee vertically adjustable on guideways formed on said column, said knee comprising a hollow casing and having an elongated gear located between said hollow casing and the guideways, said gear being adapted to mesh with a pinion on an overhanging end of the drive shaft in all vertical positions of the knee, a screw feed shaft for vertically adjusting the knee and a multi speed ratio gearing interposed between the screw shaft and the elongated gear and located within said knee casing.

9. In a milling machine, the combination of a column having a drive shaft horizontally disposed therein, a knee comprising a hollow casing and vertically adjustable on guideways formed on said column, a vertically disposed elongated gear journaled within said knee adjacent said guideways and adapted to mesh with a pinion on the drive shaft, knee adjusting devices adapted to be driven from said power shaft and gearing located within said knee casing and interposed between said elongated gear and said adjusting devices comprising a plurality of shafts disposed at right angles to said elongated gear, one of said shafts having fixedly keyed thereto, a plurality of pinions of different sizes, a second shaft having shiftable thereon two double pinions which are adapted to mesh with the different size gears on said first named shaft and a third shaft having loosely mounted thereon shiftable double pinions, said latter double pinions being adapted to simultaneously mesh with gears on the first shaft and become clutched to the third shaft.

10. In a milling machine, the combination of a column and a vertically adjustable knee mounted on guideways formed on said column, said knee being formed of a hollow inclosed casing and containing therein a variable power system of transmission comprising a series of countershafts and a multiplicity of slidable and fixed gears thereon.

11. In a milling machine, the combination of a column, with a vertically adjustable knee thereon, comprising a hollow casing slidably mounted on the column and an end closing plate for said hollow casing carrying a frame work projecting into said hollow casing, for the purpose described.

12. In a milling machine, the combination of a column carrying driving devices thereon, with a knee comprising a hollow casing slidably mounted on said column, an end closing plate for said hollow casing carrying a frame work projecting into said hollow casing, and driving devices mounted on said frame work.

13. In a milling machine, the combination of a column carrying a drive shaft thereon with a knee comprising a hollow casing slidably mounted on said column for vertical adjustment, means for elevating said hollow casing, an end closing plate for said hollow casing carrying a frame work projecting into said hollow casing and variable power transmission devices mounted on said frame work and connected with said drive shaft and said vertically adjusting means.

14. In a milling machine, the combination of a column carrying a horizontally disposed drive shaft with a knee comprising a hollow casing slidably mounted on said column for vertical adjustment thereon, vertically adjusting devices for feeding said hollow casing, a vertically disposed gear carried by said casing and meshing with a pinion on said horizontal shaft, an end closing plate for said hollow casing carrying a frame work projecting into said hollow casing and variable speed gearing devices mounted on said frame work and located between the vertical gear and the vertically adjusting devices.

15. In a milling machine, the combination of a column carrying a horizontally disposed drive shaft with a knee comprising a hollow casing slidably mounted on said column for vertical adjustment, a cylindrical pillar support for said hollow casing, said casing having integral therewith a cylindrical supporting structure coöperating with said pillar support, said cylindrical structure carrying a feed screw journaled therein, a vertically disposed spur or spiral gear mounted in said casing and meshing with a pinion on said horizontal shaft, an end closing plate for said hollow casing carrying a frame work projecting into said hollow casing and speed control devices mounted on said frame work and located between said spur or spiral gear and said feed screw.

16. In a milling machine the combination of a column carrying a horizontally disposed drive shaft with a knee comprising a hollow casing slidably mounted on said column for vertical adjustment, means for raising and lowering said hollow casing, an elongated spur or spiral gear mounted on said hollow casing and meshing with a pinion on said horizontally disposed shaft, an end closing plate for said hollow casing carrying a frame work projecting into said hollow casing and speed control devices mounted on said frame work and adapted to be connected with said spur or spiral gear and said lowering means, said speed control devices comprising a plurality of countershafts carrying shiftable pinions and clutches.

17. In a milling machine, the combination of a column carrying a drive shaft thereon with a knee comprising a hollow casing slidably mounted on said column for vertical adjustment, means for raising and lowering said hollow casing and an end closing plate for said hollow casing carrying unitary speed control devices for operating said raising and lowering means from the drive shaft on said column.

18. In a milling machine, the combination of a column and a vertically adjustable knee thereon, said knee being supported upon a hollow pillar and having a cylindrical supporting structure coöperating with said hollow pillar, said cylindrical structure being bridged at the top and having formed in said bridge a bearing, a screw shaft carrying a spiral gear and a supporting shoulder thereon journaled in said bearing, said screw shaft coöperating with an internally threaded inwardly projecting annular shoulder around the interior of the hollow pillar, and speed control devices located between the spiral gear and the screw shaft.

19. In a milling machine, the combination of a column and a knee vertically adjustable thereon comprising an upright hollow pillar support, a hollow casing, a cylindrical structure projecting up into said casing and closely surrounding said hollow pillar and a feed screw shaft coöperating with an internally threaded annular shoulder within said hollow pillar and having its upper end journaled in a bearing structure integral with the upper end of the cylindrical structure.

20. In a milling machine, a column having journaled therein a spindle and having a support for the spindle arbor bearing comprising an overhanging arm of non-circular cross section, said column having registering openings in its opposite walls for receiving said arm, said openings being of a shape similar to the cross section of the arm whereby the arm is retained therein in a non-rotatable manner.

21. In a milling machine, a column having journaled therein a spindle and a spindle arbor and having a support for the outer bearing of the arbor comprising an overhanging arm of non-circular cross section, said column having registering openings in its opposite walls above said spindle for receiving said arm, said openings being of a shape similar to the cross section of the arm whereby the arm is retained therein in a non-rotatable manner.

22. In a milling machine, a column having journaled therein a spindle and a spindle arbor and having a support for the outer bearing of the arbor comprising an overhanging arm of square cross section, said column having registering openings in its walls above the spindle for receiving said arm, said openings corresponding in shape to said arm whereby said arm is retained in a non-rotatable manner, and clamping means for securing said arm in said openings.

23. In a milling machine, the combination of a column having journaled therein a spindle and having formed on the top thereof V-shaped channels, a removable cap having inverted V-shaped channels coöperating with the channels on said column, an overhanging arm adjustably retained in said channels, and clamping means for fixing said arm in the adjusted position.

24. In a milling machine, the combination of a column having registering V-shaped channels in opposite walls on the top thereof, said channels being formed by means of inwardly projecting flanges, a removable cap positioned on said column and having V-shaped channels coöperating with the channels on the column, and an overhanging arm adjustably located in the openings formed by said coöperating channels, said arm having a contour corresponding to the openings formed by the channels, for the purpose described.

25. In a milling machine, a column having mounted therein a drive shaft, a spindle, multi speed gearing adapted to be driven from said shaft and to drive said spindle, and an adjustable bracket support for the outer end of the spindle arbor comprising an overhanging arm of a non-circular cross section, said column having similarly shaped openings in its walls and said arm passing through the similarly shaped openings, and clamping devices for fixing said overhanging arm in the adjusted position.

26. In a milling machine, a column having journaled therein a spindle and having formed on the top thereof V-shaped channels, a similarly shaped adjustable overhanging arm resting in said channels, and a removable cap having similarly shaped channels coöperating with the first named channels, said cap carrying clamping devices adapted to secure the overhanging arm in the adjusted position when the parts are assembled.

27. In a milling machine, a column having a spindle journaled therein and a support for the spindle arbor bearing comprising an overhanging arm of square cross section, said column having formed parallel with the spindle two registering V-shaped channels in its opposite walls and having a removable cap which also has coöperating inverted V-shaped channels, said channels being adapted to receive the overhanging arm in a non-rotatable manner, said cap having a cylindrical structure arranged at right angles to the channels and intersecting the top thereof and two clamping plungers located within said cylindrical structure and adapted to receive therebetween an edge of the overhanging arm.

28. In a milling machine, a column having disposed therein a drive shaft and a spindle, a multi speed gearing interposed between said drive shaft and said spindle and a shaft located at right angles to the spindle and having a worm engaging a pinion on the spindle for the purpose described.

29. In a milling machine, a column, a spindle rotatably mounted therein, a drive shaft journaled therein, multi speed gearing intermediate said drive shaft and said arbor, a rock shaft disposed at right angles to said spindle and a hand driven shaft mounted longitudinally of said rock shaft and eccentrically thereto having a worm gear adapted to mesh with a pinion on said spindle in one position of the rock shaft.

30. In a milling machine, the combination of a column, a drive shaft mounted therein, a spindle rotatably mounted therein and multi speed gearing intermediate said drive shaft and said spindle, a clutch between said drive shaft and said gear, a rock shaft mounted at right angles to said spindle, a hand operated shaft passing longitudinally through said rock shaft but mounted eccentrically therein and having a worm gear adapted to mesh with a pinion on the spindle in one position of the rock shaft and a locking device operatively connected to the said rock shaft and said clutch whereby the machine cannot be started while the worm meshes with the pinion or the shaft cannot be rocked to bring the worm into engagement with the pinion while the clutch is in operating engagement with the power shaft.

31. In a milling machine, the combination of a tool to be driven, means for adjusting said tool, a power shaft, a clutch between said power shaft and said tool, and interlocking connections between said adjusting means and said clutch for preventing throwing in the clutch while the adjustments are being made.

32. In a milling machine, the combination of a spindle journaled in the column, hand operated means for adjusting said spindle, a power shaft for driving said spindle, a clutch interposed between said power shaft and said spindle, and interlocking connections between the adjusting means and said clutch for preventing the starting of the machine while the adjustments are being made.

33. In a milling machine, the combination of a column and a knee vertically adjustable thereon, said knee being formed of a hollow casing and having a removable end closing plate therefor, said plate carrying a gear casing projecting inwardly therefrom.

34. In a milling machine, the combination of a column, a knee vertically adjustable thereon, said knee being formed of a hollow casing and having an open side, and a removable gear casing adapted to be inserted through said open side and positioned within said hollow casing.

35. In a milling machine, the combination of a column, a knee formed of a hollow casing, said knee containing therein power transmission devices and having in its top an elongated opening, a saddle mounted above said elongated opening and adjustable longitudinally of said knee, a work table carried by said saddle and adjustable longitudinally thereof, a feed shaft carried by said work table and longitudinally disposed on the lower part thereof, a vertically disposed bushing anchored in an opening in said saddle and extending downwardly into said hollow casing, a bearing structure or bracket carried by the lower end of said bushing, a feed shaft for the saddle journaled at one end in said knee casing and coöperating with said bearing structure and bushing to feed the saddle back and forth, a horizontal shaft journaled at one end in said bearing structure and at the other end in the knee casing and adapted to be clutched to said saddle feed shaft, a spiral pinion splined to said horizontal shaft and movable back and forth with said bearing structure, a vertically disposed countershaft carried by said bushing and carrying at its lower end a pinion meshing with said splined pinion and at its upper end a pinion meshing with a similar pinion on said table feed shaft, and means for connecting said horizontal shaft with the power transmission devices.

In testimony whereof we hereunto affix our signatures.

FRANK S. SHIELDS.
JOHN A. CAMM.